Figure 3:
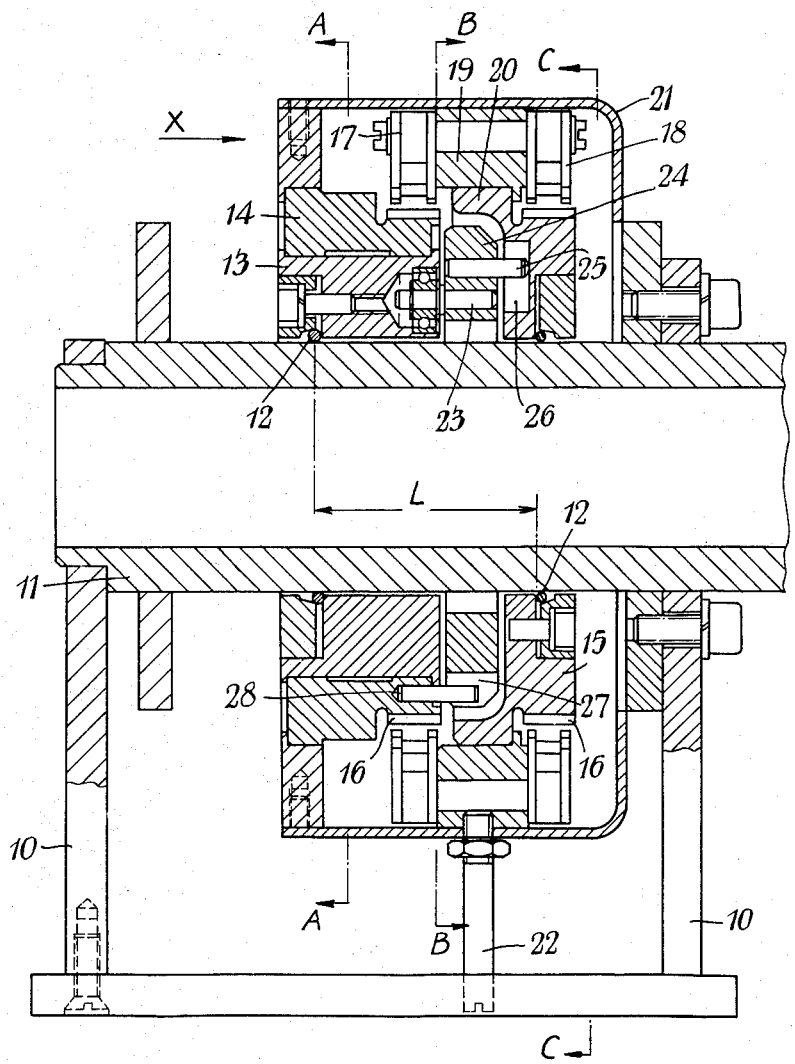

July 2, 1963    F. MAYER    3,095,734
APPARATUS FOR FURNISHING ELECTRICAL SIGNALS
FOR TORQUE MEASUREMENT
Filed June 14, 1961    4 Sheets-Sheet 1
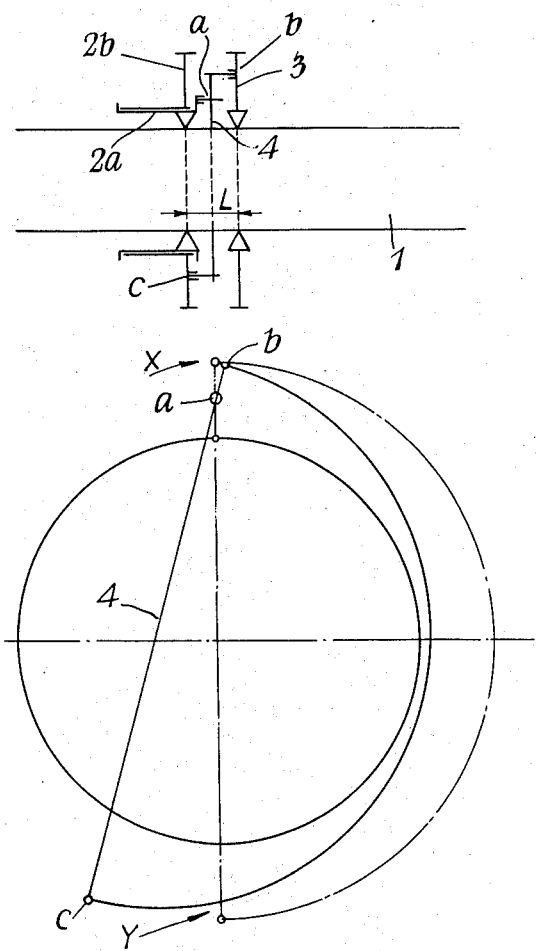
FIG.1
FIG.2
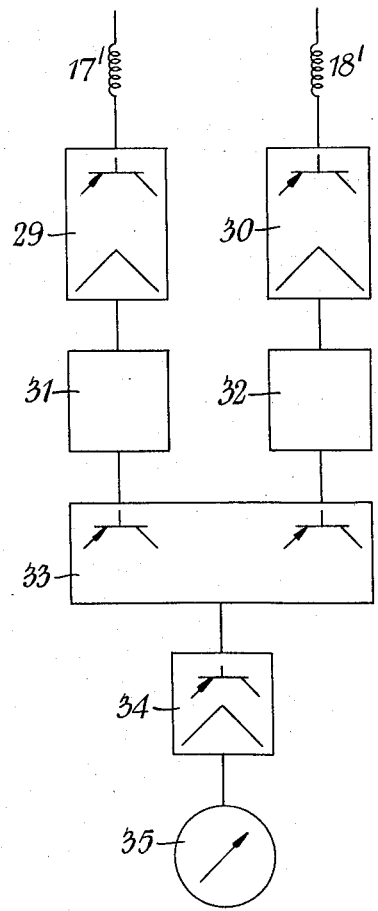
FIG.6
Inventor:
Friedrich Mayer
BY Baldwin & Wight
Attorneys July 2, 1963  F. MAYER  3,095,734
APPARATUS FOR FURNISHING ELECTRICAL SIGNALS
FOR TORQUE MEASUREMENT
Filed June 14, 1961  4 Sheets-Sheet 3

Inventor:
Friedrich Mayer
BY Baldwin & Wight
Attorneys

July 2, 1963  F. MAYER  3,095,734
APPARATUS FOR FURNISHING ELECTRICAL SIGNALS
FOR TORQUE MEASUREMENT
Filed June 14, 1961  4 Sheets-Sheet 4

Inventor:
Friedrich Mayer
By Baldwin & Wight
Attorneys

United States Patent Office 3,095,734
Patented July 2, 1963

3,095,734
APPARATUS FOR FURNISHING ELECTRICAL SIGNALS FOR TORQUE MEASUREMENT
Friedrich Mayer, Sarnen, Switzerland, assignor to G.A. Messen-Jaschin, Sarnen, Switzerland, a corporation of Switzerland
Filed June 14, 1961, Ser. No. 117,142
Claims priority, application Switzerland June 16, 1960
8 Claims. (Cl. 73—136)

The present invention relates to apparatus for furnishing electrical signals for torque measurement.

For measuring the torque on a shaft, where the latter is of circular cross-section, measurement may be made of the angle through which one portion of the shaft turns with respect to another portion spaced therefrom along the length of the shaft. However, since this angle is very small, if the shaft is not stressed beyond the elastic limit of the shaft material, conventional measuring methods based upon this principle require a relatively large measuring length, i.e. a large distance between the aforementioned portions of the shaft, which is not always available. Not all torsion-measuring methods can be used when the shaft is rotating and in such cases measurement must be made with the shaft stationary and the torque in the dynamic state is calculated therefrom.

The difficulties which reside in the requirement for a large measuring length in the case of a direct torsion measurement have led to a limited adoption of the electrical strain gauge method. In the latter method, the amount by which one portion of the shaft turns relative to another portion is measured, but for this purpose the strain gauge strip can be diagonally applied, and in extreme cases even wound around the shaft in such manner that a substantially shorter part of the shaft itself is required as the measuring length. However, in the strain gauge method, the current is transmitted through slip rings from the rotating part to the measuring instrument itself. Uncontrollable and unremovable measurement errors may thus be introduced into the measuring method, and for that reason, inter alia, the strain gauge method has found only a limited field of application. The most accurate method of transmitting the measured value is that of inductive transmission. Without dealing with the details of the measuring methods based upon this principle, it can here again be stated that a large measuring length is required for obtaining indications of the measured value, in order that the amount by which one end of the measuring length turns relative to the other end is sufficient to lead to differences measurable through two tone wheels.

According to the present invention there is provided apparatus for furnishing electrical signals for torque measurement, comprising a shaft, the torque on which is to be measured, first and second wheels co-axial with the shaft and secured to the shaft at first and second locations spaced apart along the shaft, so as to turn in accordance with the turning of the shaft at said first and second locations, respectively, a third wheel co-axial with the shaft and mounted to turn with respect thereto, a ring of teeth of magnetic material on the second wheel, a ring of teeth of magnetic material on the third wheel of equal pitch to the teeth on the second wheel, coupling means coupling the third wheel to the first and second wheels such that relative turning between the first and second wheels brings about a proportionally greater relative turning between the second and third wheels, a stator adjacent the rings of teeth and means in the stator for co-operating with the teeth for the generation of alternating current when the shaft turns.

For a better understanding of the invention and to show how the same may be carried into effect, reference will now be made to the accompanying drawings in which:

FIGURES 1 and 2 illustrate diagrammatically in side elevation and in enlarged cross-section the principle of an apparatus for furnishing electrical signals for torque measurement.

Figure 4:
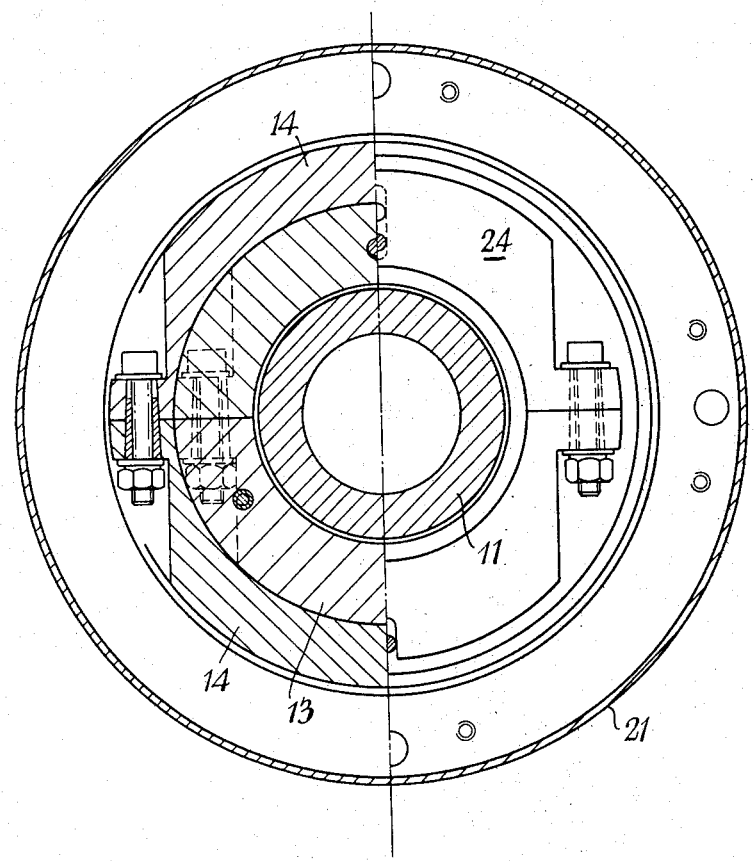
Figure 5:
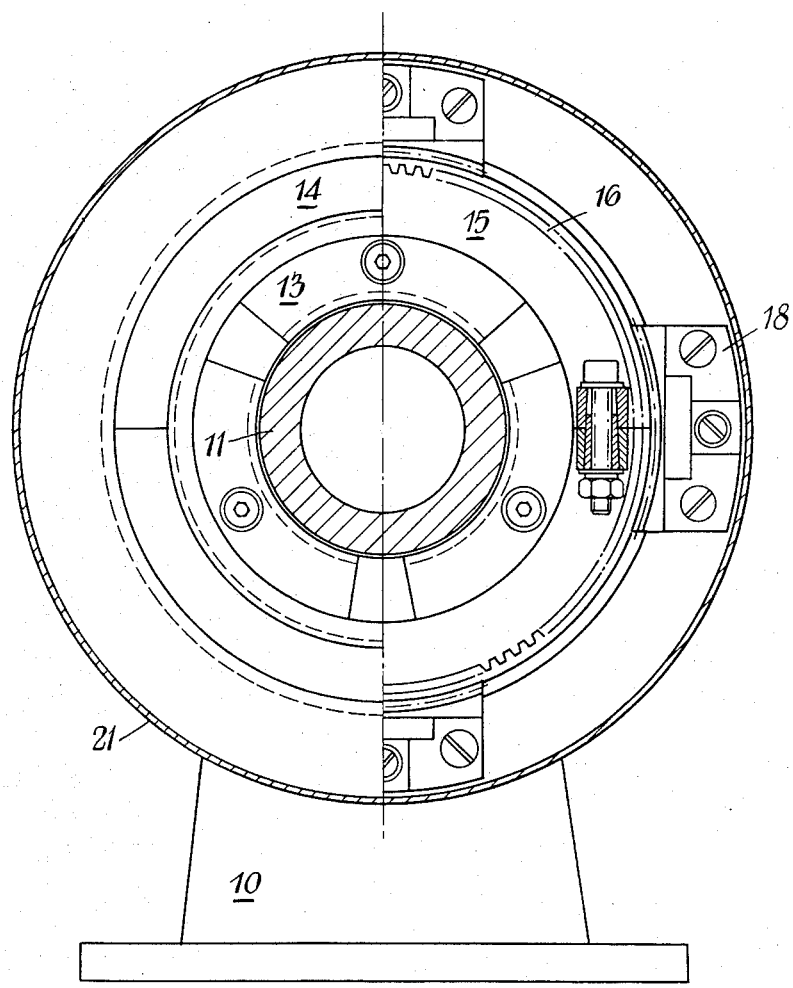

FIGURE 3 shows an axial sectional view of a constructional example of the apparatus represented by FIGURES 1 and 2, FIGURE 4 illustrates on the left-hand side and the right-hand side, respectively, cross-sections of the apparatus taken as indicated by the lines A—A and B—B in FIGURE 3, FIGURE 5 illustrates on the left-hand side and the right-hand side, respectively, an end view of the apparatus, taken as indicated by the line X in FIGURE 3 and a cross-section taken as indicated by the line C—C in FIGURE 3, and FIGURE 6 is a block circuit diagram of an apparatus for using the electrical signals to indicate torque.

In FIGURE 1, there is denoted by 1 a shaft to which a torque is to be applied in a manner not illustrated. There is denoted by L a relatively short available measuring length. Fixedly mounted on the shaft 1 at one end of the measuring length is a first wheel 2a, whilst at the other end of the measuring length there is fixedly mounted a second wheel 3. A third wheel 2b is so mounted on the wheel 2a as to be rotatable thereon. The second and third wheels 3 and 2b are tone wheels. Each of them has a ring of teeth of magnetic material and the pitch of the teeth is the same for each wheel. In fact, the two rings of teeth are identical. These teeth co-operate with magnetic pick-up heads of a stator, not illustrated in FIGURE 1, in which electrical signals, which may be used to indicate the torque, are generated.

An arcuate coupling member 4 extends around the shaft 1 and is pivotally connected where indicated at a, b and c to the wheels 2a, 3 and 2b, respectively. The member 4 thus constitutes a lever having two arms a—b and a—c. Not only does this arrangement ensure that the wheel 2b is driven at the same speed as the shaft but it also ensures that if the wheel 2a turns through a small angle, as shown at x in FIGURE 2, relative to the wheel 3, due to torsion in the shaft, the wheel 2b turns relative to the wheel 3, through a larger angle, as shown at y, the ratio of the two angles being determined by the distances a—b and a—c, respectively.

The member 4 need not extend as much as half-way around the shaft but a higher transmission ratio is obtained if it does so. The member 4 could be crescent-shaped, semi-circular or C-shaped or annular. It is annular in the constructional example illustrated in FIGURES 3 to 5, in which there is mounted in a fixed structure 10 a short hollow shaft 11 to which a torque can be applied in a manner not shown. For example, the shaft in question may be a driving shaft for the rotor of a helicopter. First and second wheels 13 and 15 are fixedly mounted on the shaft 11 with the aid of rings of wire 12 which are clamped to the wheels 13 and 15 and each of which makes contact with the shaft over only a circular line thereon, the distance apart of such lines being the measuring length L. A third wheel 14 is so mounted around the wheel 13 as to turn relative thereto.

The wheels 14 and 15 are each provided in a manner known per se with an external toothed rim 16, these being of like construction. One toothed rim co-operates with a set of four pick-up heads 17 and the other with a set of four pick-up heads 18, these heads being mounted in a stator 19 and constructed to have induced in them voltages from which the torque can then be determined in a measuring device not shown. The stator 19 bears against a peripheral flange 20 on the wheel 15 and in turn supports a housing 21 surrounding the entire apparatus. The stator is prevented from rotating by means of a pin 22 projecting from the structure 10.

A rockable ring 24, corresponding to the coupling member 4 of FIGURE 1, surrounds the shaft 11 with large clearance. It is pivotally mounted on the wheel 13 by means of a pin 23 that extends into a ball bearing. Radially beyond the pin 23 is a pin 25 which is mounted in the ring 24 and which extends into a radial recess 26 in the wheel 15. Another pin 28 is mounted in the wheel 14 and projects into a radial slot in the ring 24, diametrically opposite the pin 25.

When a torque, to be measured, is exerted on the shaft 11 whilst it is rotating, the two wheels 13 and 15 undergo relative angular displacement, to the extent to which one end of the measuring length L turns relative to the other end. The small angular displacement of the wheel 13 in relation to the wheel 15 is converted by the ring 24 into a larger angular displacement of the wheel 14 in relation to the wheel 15. The transmission ratio corresponds to the ratio of the lengths of the lever arms between the axes of the pins 23 and 25, and 23 and 28.

It will be apparent from FIGURES 4 and 5 that the individual wheels 13, 14 and 15 and the ring 24 are each constructed in two parts held together by screws.

For the so-called zero point calibration of the apparatus, the pin 22, i.e. the means by which the stator is secured against rotation, is withdrawn and the latter is thus rotated in relation to the stationary rotor in order thus to supply in the inverse sense the electrical measurement values for the zero point adjustment of the apparatus. In this case, the voltages are collected from the stator through slip rings not shown.

The phase difference between the alternating voltages obtained from the pick-up heads 17 and 18 is a measure of the torque to be determined. Comparison of the phase positions of the two alternating voltages may be carried out in an additional electronically operating device the block circuit diagram of which is shown in FIGURE 6. Windings 17' and 18' of the pick-up heads 17 and 18 are connected to the inputs of respective amplifiers, 29 and 30 which have amplitude limiters and which convert the substantially sinusoidal voltages from the windings 17' and 18' into rectangular pulses. Since the windings 17' and 18' are preferably made with low resistance, transistorized amplifiers 29 and 30 are advantageous in which at least the input stage is provided with transistors. The rectangular pulses supplied by the amplifiers 29 and 30 are differentiated in two networks 31 and 32, so that the passages of the differentiated rectangular pulses through zero define the momentary phase positions of the alternating voltages set up in the windings 17' and 18'. The differentiated voltages available at the output of the networks 31 and 32 are employed to drive a bistable multivibrator 33 which supplies rectangular pulses the width of which is equal to the value of the phase difference obtaining between the sinusoidal input voltages. The width of the rectangular pulses generated by the multivibrator 33 thus constitutes a measure of the torque to be measured if the amplitude of these rectangular pulses remains constant. If integration is effected by way of the pulse sequence of these rectangular pulses, the mean time value set up is also a measure of the torque to be measured. For this purpose, there may be connected on the output side of the bistable multivibrator 33 a further amplifier 34 which feeds a measuring instrument 35 the scale of which is directly calibrated in units of torque. Of course, in most cases, not only the input stage of the amplifiers 29 and 30, but also the multivibrator 33 and the further amplifier 34 will be completely equipped with transistors.

It is possible with the described apparatus to measure the torque on a shaft during its normal operation, since the apparatus requires only a little space and can therefore be fixedly installed in substantially any machine to be tested.

I claim:

1. Apparatus for furnishing electrical signals for torque measurement, comprising a shaft, the torque on which is to be measured, first and second wheels co-axial with the shaft and secured to the shaft at first and second locations spaced apart along the shaft so as to turn in accordance with the turning of the shaft at said first and second locations, respectively, a third wheel co-axial with the shaft and mounted to turn with respect thereto, a ring of teeth of magnetic material on the second wheel, a ring of teeth of magnetic material on the third wheel of equal pitch to the teeth on the second wheel, coupling means coupling the third wheel to the first and second wheels such that relative turning between the first and second wheels brings about a proportionally greater relative turning between the second and third wheels, a stator adjacent the rings of teeth, means in the stator for co-operating with the teeth of the second wheel for the generation of alternating current when the shaft turns and means in the stator for cooperating with the teeth of the third wheel for the generation of alternating current, when the shaft turns, which is phase-displaced from the first-mentioned alternating current by an amount dependent upon the torque on the shaft.

2. Apparatus for furnishing electrical signals for torque measurement, comprising a shaft, the torque on which is to be measured, first and second wheels co-axial with the shaft, first and second fixing means secured to the first and second wheels, respectively, and making substantially line contact with the shaft around first and second spaced peripheral lines on the shaft, whereby the first and second wheels will turn in accordance with the turning of the shaft at said first and second lines, respectively, a third wheel co-axial with the shaft and mounted to turn with respect thereto, a ring of teeth of magnetic material on the second wheel, a ring of teeth of magnetic material on the third wheel of equal pitch to the teeth on the second wheel, coupling means coupling the third wheel to the first and second wheels such that relative turning between the first and second wheels brings about a proportionally greater relative turning between the second and third wheels, a stator adjacent the rings of teeth, means in the stator for cooperating with the teeth of the second wheel for the generation of alternating current when the shaft turns and means in the stator for cooperating with the teeth of the third wheel for the generation of alternating current, when the shaft turns, which is phase-displaced from the first-mentioned alternating current by an amount dependent upon the torque on the shaft.

3. Apparatus for furnishing electrical signals for torque measurement, comprising a shaft, the torque on which is to be measured, first and second wheels co-axial with the shaft and secured to the shaft at first and second locations spaced apart along the shaft so as to turn in accordance with the turning of the shaft at said first and second locations, respectively, a third wheel co-axial with the shaft and mounted to turn with respect thereto, a ring of teeth of magnetic material on the second wheel, a ring of teeth of magnetic material on the third wheel of equal pitch to the teeth on the second wheel, a curved lever extending at least part of the way around the shaft, first, second and third pivotal connections between the lever and the first, second and third wheels, respectively, the distance between the first and third pivotal connections being greater than the distance between the first and second pivotal connections so that relative turning between the first and second wheels brings about a proportionally greater relative turning between the second and third wheels, a stator adjacent the rings of teeth, means in the stator for cooperating with the teeth of the second wheel for the generation of alternating current when the shaft turns and means in the stator for cooperating with the teeth of the third wheel for the generation of alternating current, when the shaft turns, which is phase-displaced from the first-mentioned alternating current by an amount dependent upon the torque on the shaft.

4. Apparatus for furnishing electrical signals for torque measurement, comprising a shaft, the torque on which is to be measured, first and second wheels co-axial with the shaft, first and second fixing means secured to the first and second wheels, respectively, and making substantially line contact with the shaft around first and second spaced peripheral lines on the shaft, whereby the first and second wheels will turn in accordance with the turning of the shaft at said first and second lines, respectively, a third wheel co-axial with the shaft and mounted to turn with respect thereto, a ring of teeth of magnetic material on the second wheel, a ring of teeth of magnetic material on the third wheel of equal pitch to the teeth on the second wheel, a curved lever extending at least part of the way around the shaft, first, second and third pivotal connections between the lever and the first, second and third wheels, respectively, the distance between the first and third pivotal connections being greater than the distance between the first and second pivotal connections so that relative turning between the first and second wheels brings about a proportionally greater relative turning between the second and third wheels, a stator adjacent the rings of teeth, means in the stator for cooperating with the teeth of the second wheel for the generation of alternating current when the shaft turns and means in the stator for cooperating with the teeth of the third wheel for the generation of alternating current, when the shaft turns, which is phase-displaced from the first-mentioned alternating current by an amount dependent upon the torque on the shaft.

5. Apparatus according to claim 1, wherein the third wheel concentrically surrounds the first wheel.

6. Apparatus according to claim 3, wherein the third wheel concentrically surrounds the first wheel and wherein the first pivotal connection is afforded by a pin which projects into said lever and into the first wheel and the second pivotal connection is afforded by a second pin which is radially beyond the first pin and which is mounted in the lever, and the apparatus further comprises portions of the second wheel defining a radial slot therein into which the second pin projects, and portions of the lever defining therein a second radial slot which is diametrically opposite the first-mentioned radial slot, and wherein the third pivotal connection is afforded by a pin mounted in the third wheel and projecting into the second slot.

7. Apparatus according to claim 1, further comprising a peripheral flange on the second wheel against which the the stator bears and releasable means for securing the stator against rotation.

8. Apparatus according to claim 2, wherein said fixing means include two rings of wire and means for clamping them to the shaft and to the first and second rings, respectively.

References Cited in the file of this patent
UNITED STATES PATENTS

| | | |
|---|---|---|
| 2,616,290 | Moore | Nov. 4, 1952 |
| 2,766,617 | Tyler et al. | Oct. 16, 1956 |